United States Patent [19]
Berger

[11] Patent Number: 5,637,943
[45] Date of Patent: Jun. 10, 1997

[54] ROTOR GROOVE

[75] Inventor: Josef Berger, Vienna, Austria

[73] Assignee: Elin Motoren, Vienna, Austria

[21] Appl. No.: 446,611

[22] PCT Filed: Dec. 1, 1993

[86] PCT No.: PCT/AT93/00181

§ 371 Date: May 31, 1995

§ 102(e) Date: May 31, 1995

[87] PCT Pub. No.: WO94/13054

PCT Pub. Date: Jun. 9, 1994

[30] Foreign Application Priority Data

Dec. 1, 1992 [AT] Austria ................. 2368/92

[51] Int. Cl.⁶ ......................................... H02K 17/16
[52] U.S. Cl. ................................. 310/211; 310/216
[58] Field of Search .............................. 310/211, 212, 310/215, 216, 193

[56] References Cited

U.S. PATENT DOCUMENTS

| | | |
|---|---|---|
| 2,350,012 | 5/1944 | Brady . |
| 3,137,800 | 6/1964 | Young ................. 310/212 |
| 3,778,652 | 12/1973 | Endress ................. 310/211 |
| 3,832,583 | 8/1974 | Chang . |
| 4,559,463 | 12/1985 | Kobayashi ................. 310/156 |
| 4,782,260 | 11/1988 | Gandhi et al. ............. 310/216 |

FOREIGN PATENT DOCUMENTS 1190094  4/1965  Germany .

OTHER PUBLICATIONS

The Patent Abstracts of Japan, p. 91 E 848, No. 61–92143 (Matsushita).
The Patent Abstracts of Japan, p. 91 E 848, No. 01–209940 (Matsushita).

*Primary Examiner*—Thomas M. Dougherty
*Assistant Examiner*—Jonathan Link
*Attorney, Agent, or Firm*—Greenblum & Bernstein, P.L.C.

[57] ABSTRACT

In a squirrel-cage rotor, the theoretical ideal groove cross section is divided radially into at least two zones, which are displaced relative to each other alternatively in and against the direction of rotation of the rotor, the groove cross section including protuberances that extend into the theoretical ideal groove cross section and bulges that extend from the theoretically ideal groove cross section in a manner that the width of a tooth between the individual grooves remains the same as the theoretical ideal groove cross section, thus preventing the conductor rods from shifting either as they cool after aluminum has been introduced into the grooves or at high rotational rotor speeds.

7 Claims, 1 Drawing Sheet

ROTOR GROOVE

CROSS REFERENCE TO RELATED APPLICATIONS

This application claims the priority of PCT Application PCT/AT93/00181 (Publication No. WO 94/13054, filed Dec. 1, 1993, which in turn claims the priority of Austrian Application No. A 2368/92, filed Dec. 1, 1992, the disclosures of which are incorporated herein by reference in their entireties.

BACKGROUND OF THE INVENTION

1. Field of the Invention

The invention pertains to a squirrel-cage rotor having closed grooves extending along the circumference of the rotor, in which a squirrel cage rotor, with closed grooves extending along the circumference of the rotor, in which grooves, via the introduction of aluminum, aluminum conductor rods are produced, with the conductor rods filling out the grooves, wherein the groove cross section includes noses that extend into ideally-deemed groove cross sections, and bulges extend from the ideally-deemed groove cross sections.

2. Discussion of the Background of the Invention and Material Information

Asynchronous machines, with squirrel-cage rotors, due to their great advantages, such as, for example, low acquisition costs and low operating costs, ready adaptability to a large number of differing machines, as well as low maintenance, enjoy a broad distribution. These are usable in those instances having only low requirements relative to revolution, stability and speed range. In the start up phase generally no additional actuators are required.

In rotors having aluminum-compression or centrifugally cast squirrel-cages in the revolution range over 6000Rpm, it is a common occurrence that the rotors become imbalanced due to the shifting or displacement of the conductor rods in their grooves. Such shifts or displacements of the conductor rods already occurs either during the cooling of the aluminum, due to the considerable shrinkage thereof, or during high speed operation.

German Patent Publication DE, B, 1 190 094 describes an attachment of rods in the squirrel-cage rotor of electrical machines, in which embossed noses are provided on the rods, which fit into corresponding recesses in the rod grooves.

U.S. Pat. No. 2,350,012 describes a rotor having closed grooves which includes noses that extend into the groove thereby significantly varying the tooth width between the grooves.

It is the task of the invention to produce, with simple means, a squirrel-cage rotor whose conductor rods are so fixed in place that, even at very high speed operation, no imbalance can occur.

SUMMARY OF THE INVENTION

This task is achieved via this invention. The squirrel-cage rotor is therein characterized, that the ideally-deemed or theoretically ideal groove cross section, in the radial direction, is divided into at least two groove zones and that the groove zones are alternately displaced in and against the direction of rotation of the rotor, so that the width of the tooth, between two neighboring grooves, remains the same over the entire height of the groove.

Specifically, one embodiment of this invention pertains to a squirrel cage rotor, having closed grooves extending along the circumference of the rotor, in which grooves, via the introduction of aluminum, aluminum conductor rods are produced, with the conductor rods filling out the grooves, wherein the groove cross section includes protuberances that extend into theoretically ideal groove cross sections, and bulges that extend from the theoretically ideal groove cross sections, with each groove cross section, in the radial direction, being divided into at least two groove zones wherein the groove zones, with reference to the theoretically ideal groove cross sections, being alternately displaced in and against the direction of rotation of the rotor, so that each conductor rod is fixed in place both upon cooling of the aluminum as well as at high rotational rotor speeds, with the width of a tooth, between two neighboring grooves, remaining the same over the entire extent of the groove.

In a further embodiment of the squirrel cage rotor of this invention, the protuberances and the bulges are of substantially similar shape.

In another embodiment of the squirrel cage rotor of this invention, the protuberances and the bulges are of substantially similar size.

In a differing embodiment of the squirrel cage rotor of this invention, the protuberances and the bulges are alternately radially oppositely directed.

In yet a further embodiment of the squirrel cage rotor of this invention, each groove zone includes at least one protuberance and at least one bulge.

In yet another embodiment of the squirrel cage rotor of this invention, the at least one protuberance and at least one bulge are located on laterally opposed groove walls.

The use of this invention, allows, for the first time, the production of a groove shape for a squirrel-cage rotor which retains the conductor rod in a fixed position and thereby prohibits, with certainty, any imbalancing.

BRIEF DESCRIPTION OF THE DRAWINGS

The invention will be better understood and objects other than those set forth above will become apparent when consideration is given to the following detailed description thereof. Such description makes reference to the annexed drawing wherein.

DETAILED DESCRIPTION OF THE PREFERRED EMBODIMENTS

Figure 1:
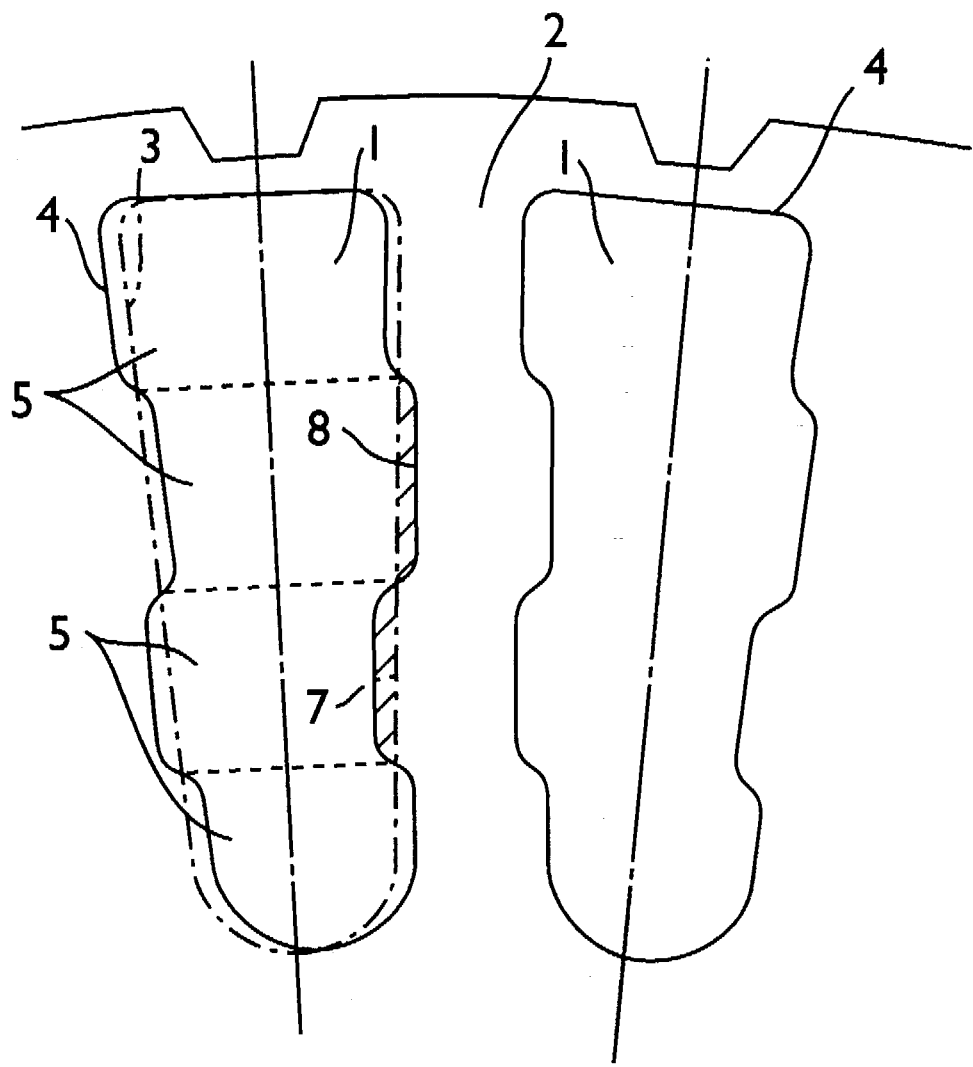
FIG. 1 shows a groove cross section in accordance with this invention in heavy lines and a theoretically ideal groove cross section in dot-dash lines.

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

With the aid of an embodiment this invention will now be described in more detail. FIG. 1 shows a groove cross section (profile) 4 in accordance with the invention, in which the groove cross section 3, which is deemed ideal, is shown in dot-dash lines and wherein groove cross section 4 of the invention is shown in heavy lines. The ideally-deemed groove cross section 3 is divided, in the radial direction, into four groove zones 5, wherein groove zones 5 are alternately displaced in and against the direction of rotation of the rotor.

Groove cross section 4 includes noses, protuberances or lugs 7 that extends into theoretically ideal groove cross section 3, and bulges or extentions 8 that extend from the theoretically ideal groove cross section 3. This produces groove cross section 4 according to the invention, wherein the width of tooth 2, between individual ones of the grooves of this invention, with respect to ideally-deemed groove 3, remains unchanged. As shown in the figure, the ideally deemed groove 3 is essentially a smoothed version of groove profile 4 in which the ideal groove periphery (indicated by the dash-dot line) is positioned midway between the protuberances 7 and bulges 8 of the groove profile 4 may be considered the ideal groove 3. This groove form or shape, prohibits, with certainty, a displacement or shifting of the conductor rod during cooling as well after the introduction of aluminum into the groove as well as also at high rotational speeds. Preferably, protuberances 7 and bulges 8 are of substantially similar shape and size and are alternately radially oppositely directed. Similarly, each groove zone 5 includes at least one protuberance 7 and at least one bulge 8, with preferably at least one protuberance 7 and at least one bulge 8 being located on laterally opposed groove walls.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A squirrel cage rotor having a plurality of grooves positioned along a circumference of said rotor for receiving aluminum conductor rods said squirrel cage rotor comprising:

a groove profile associated with each of the plurality of grooves including a plurality of protuberances extending into a theoretically ideal groove cross section and a plurality of bulges extending from said theoretically ideal groove cross section;

each groove profile, in a radial direction, comprising at least two groove zones, each groove zone associated with one of said plurality of protuberances and with one of said plurality of bulges, such that each said groove zone is alternately displaced in and against a direction of rotation of said rotor for fixing in place the aluminum rods; and a plurality of teeth comprising a uniform width, each of said plurality of teeth positioned between adjacent grooves.

2. The squirrel cage rotor of claim 1, wherein the protuberances and the bulges are of substantially similar shape.

3. The squirrel cage rotor of claim 1, wherein the protuberances and the bulges are of substantially similar size.

4. The squirrel cage rotor of claim 2, wherein the protuberances and the bulges are of substantially similar size.

5. The squirrel cage rotor of claim 1, wherein the protuberances and the bulges are alternately radially oppositely directed.

6. The squirrel cage rotor of claim 1, wherein each groove zone includes at least one protuberance and at least one bulge.

7. The squirrel cage rotor of claim 6, wherein the at least one protuberance and at least one bulge are located on laterally opposed groove walls.

* * * * *